H. A. BLEY.
PLANT SETTER.
APPLICATION FILED MAR. 28, 1916.

1,222,921.

Patented Apr. 17, 1917.
2 SHEETS—SHEET 1.

Witnesses

Inventor
H. A. Bley.
By
Attorneys

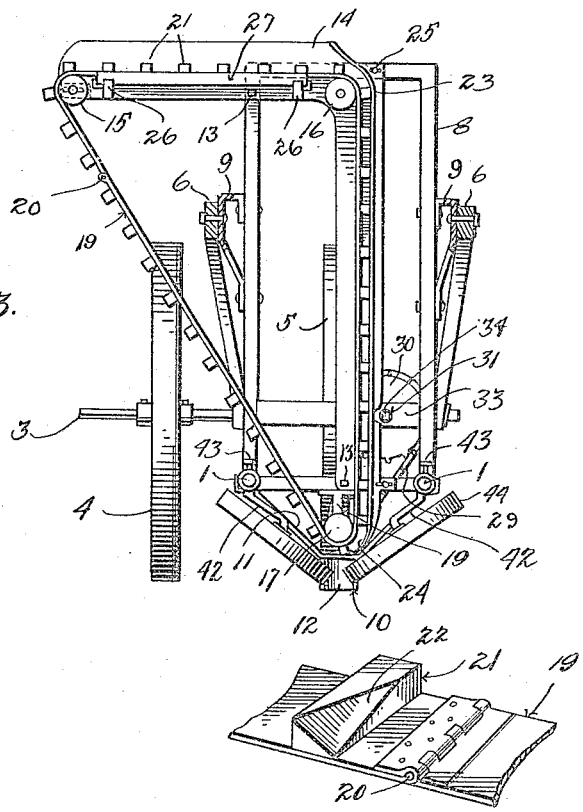
Fig.3.
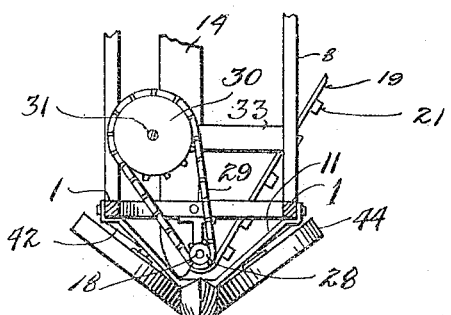
Fig.4.
Fig.5.

UNITED STATES PATENT OFFICE.

HENRY A. BLEY, OF EDEN, NEW YORK.

PLANT-SETTER.

1,222,921. Specification of Letters Patent. Patented Apr. 17, 1917.

Application filed March 28, 1916. Serial No. 87,329.

*To all whom it may concern:*

Be it known that I, HENRY A. BLEY, a citizen of the United States, residing at Eden, in the county of Erie, State of New York, have invented certain new and useful Improvements in Plant-Setters; and I do hereby declare the following to be a full, clear, and exact description of the invention, such as will enable others skilled in the art to which it appertains to make and use the same.

This invention relates to a plant setter.

An object of the invention resides in the provision of a device by means of which celery or similar plants may be properly set in the ground.

A further object of the invention resides in so constructing the device that a furrow will be opened, the plants set and the furrow closed, automatically, during the advance of the machine.

With these and other objects in view, such as will appear as my description progresses, my invention comprises the combination and arrangement of parts as set forth in and falling within the scope of the appended claims.

In the drawing:

Fig. 3 is a vertical sectional view looking at the feed belt;

Fig. 4 is a fragmental perspective view showing the manner in which the blocks are mounted upon the plant feeder and the shape of the block, and Fig. 5 is a fragmental sectional view looking at the forward portion of the machine and disclosing the furrow opening shoe and the closing wheels.

Figure 1:
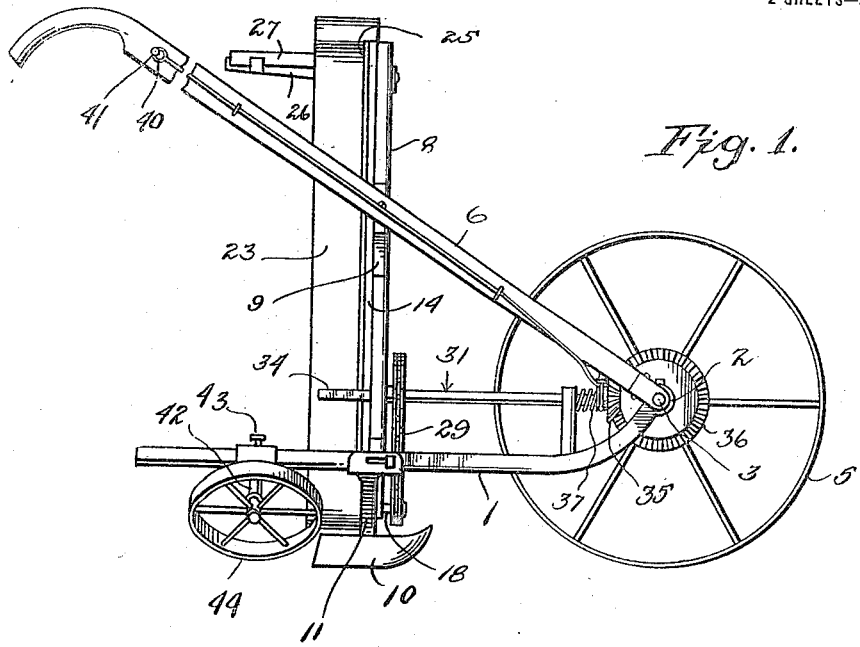
Figure 1 is an elevation of my machine showing the plant setter attachment thereon.

In the drawing I have illustrated a machine which includes a pair of horizontally disposed side bars 1 which are curved upwardly at their forward ends and having bearings 2 formed thereon, in which bearings an axle 3 is rotatably mounted. Secured to this axle are supporting or ground wheels 4 and 5. Extending upwardly from this axle 3 are handles 6 which are braced at their rear ends by a cross bar 7 and which are secured to a vertical rectangular frame 8 by brackets 9. This frame is rigid with and extends upwardly from the side bars 1.

In order that a furrow may be opened, celery plants set and the furrow closed, I have provided the following mechanism:

A furrow opening shoe or plow 10 is adjustably secured to the side bars 1 by suitable brackets 11. The rear portion of this shoe 10 is cut away forming a recess 12, the purpose of which will later appear. Mounted upon the rectangular frame 8 by means of suitable bolts 13 is an inverted L-shaped plate 14. A pair of pulleys 15 and 16 are mounted on the horizontal portion of this plate and a pulley 17 is mounted upon a shaft 18 which extends through a hanger 19, which hanger depends from the frame 8, the pulley being directly in the rear of the shoe 10 and above the recess 12 therein. An endless belt 19 passes around these pulleys 15, 16 and 17 and may be tightened by means of the pulley 15 which is adjustably mounted as clearly illustrated in Fig. 3 of the drawing. The ends of this belt are secured together by a pin 20 which passes through suitable ears and mounted upon and extending transversely of the belt in equal spaced relation are a plurality of elongated blocks 21 which are substantially rectangular in formation but which are provided with a cut-out or beveled portion 22 such as illustrated in Fig. 4 of the drawing. Adjustably mounted upon the plate 14 is a guide plate 23 which extends vertically and is curved at its lower end as at 24 toward the pulley 17. This plate is so mounted that when the blocks 21 move vertically downwardly it will prevent the displacement of any material or plants which may be carried by the block until the blocks have passed below its lower end. The adjustment of this plate is had by means of set screws 25 which are mounted on the frame 8 and extend through slots in the plate.

Figure 2:
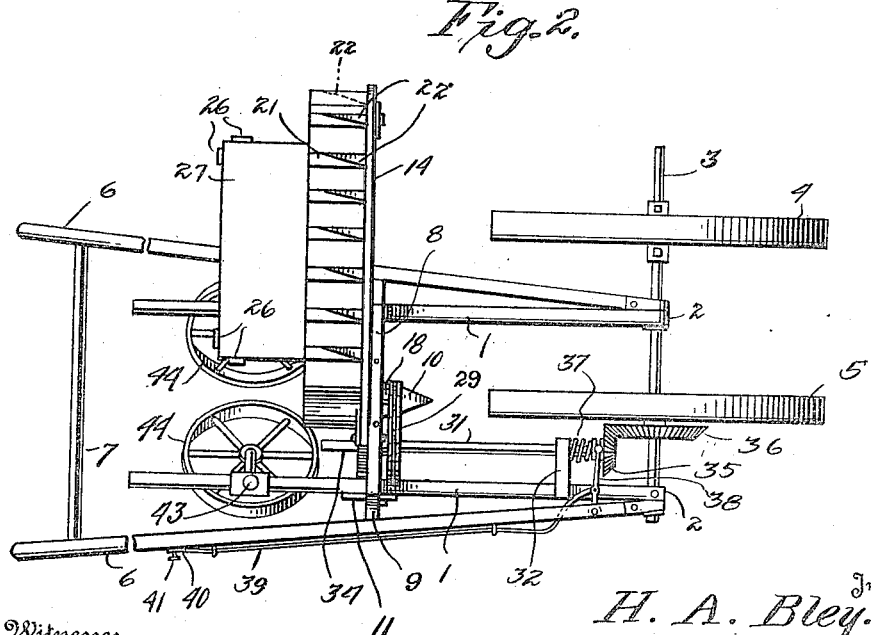
Fig. 2 is a plan view of the same.

Mounted upon the plate 14 by means of suitable brackets 26 is a work support 27 which may be readily removed from the brackets and replaced by a similar one. This work support, as illustrated in Fig. 2 is disposed immediately adjacent to one edge of the belt 19 so that plants may be arranged upon the support and fed between the blocks 21 by hand. Secured to the forward end of the shaft 18 is a sprocket 28 around which a chain 29 passes, which chain also passes around a relatively larger sprocket 30, which latter sprocket is secured to a shaft 31. This shaft 31 is mounted in a bearing 32 on one of the side bars 1 and in a horizontal bar 33 extending through the vertical members of the frame 8. The end of this shaft 31 protrudes beyond the bar 33 and is squared as at 34. A beveled gear 35 is splined to the shaft 31 so that it will rotate therewith and so that it may have sliding movement thereon, which gear meshes with a relatively larger beveled gear 36 secured to the axle 3. The gear 35 is normally held in intermeshing relation with the gear 36 by a coiled spring 37 but may be disengaged from the gear by means of a shipper lever 38 which is pivoted to one of the handles 6 and is controlled by means of a wire 39 which, when the gear 35 is to be disengaged from the gear 36 is pulled and secured, by means of a loop 40 to a pin 41 upon the handle. Mounted upon axles 42 which are longitudinally and rotatably adjustable on the side bars 1 and held in their adjusted positions by set screws 43 are covering or packing wheels 44 which converge downwardly toward the center of the machine. Their adjacent edges are located immediately in the rear of the recess 12 and the space between these edges may be varied by the rotation of the axles 42 upon the bars 1.

In operation the celery plants are placed upon the work support 27 so that they extend transversely thereof with the loops toward the belt 19. As the machine advances the belt, through the operating mechanism described, will be actuated and the operator may feed the plants from the support 27 to the belt, locating each plant between a pair of blocks 21 so that the roots will be adjacent to the beveled portions 22. As the belt moves the plants will be carried downwardly between the belt and the plate 23, resting at this time upon the lower block. When the plants are in this position the roots will, naturally, fall upon the beveled portion 22 of the blocks and this portion of the plant will be first released as the plant passes beyond the lower end of the plate 23 so that the root will drop into the furrow, which has been previously formed by the shoe 10. The remainder of the plant will then gradually be released as the block moves away from the lower edge of the plate 23 and the wheels 44 will bank the soil about the plant and pack the same around the roots so that the plant will be held in a vertical position and the soil firmly packed about the roots so as to facilitate the growing of the plant. Now of course the positions of the wheels 44 may be varied so that the distance between their adjacent edges may be made greater or less to accommodate larger or smaller plants and to pack the soil in accordance with the size of the plants being set.

It will thus be seen that I have provided a planter by means of which celery plants may be properly planted and I have so constructed the device that the celery plants will be placed in the ground root first, the soil banked about the plants and packed around the roots.

While I have illustrated and described a particular embodiment of my invention, it has merely been for the sake of convenience and I do not wish to be limited to that particular embodiment as it is obvious that numerous changes may be made in the details of construction without departing from the spirit of the invention or exceeding the scope of the appended claims.

What I claim is:—

1. In a planter, means for opening a furrow, means for depositing celery plants in the furrow with the roots extending downwardly and adjustably mounted means for closing the furrow and packing the earth about the roots before the plants leave the depositing means.

2. In a planter, the combination with a furrow opening shoe, of a vertically extending endless belt, means for rotating the belt, means for supporting celery plants in a horizontal position with the roots extending downwardly during their entire movement to the ground, means for releasing the plant from the first mentioned means, roots first and means for closing the furrow and packing the earth about the roots.

3. In a planter, the combination with furrow opening means, of a vertically movable endless belt, a plurality of elongated blocks extending transversely thereof, means for rotating the belt, the path of movement of the belt being vertically, horizontally and diagonally, the said blocks being adapted to support celery plants and having beveled portions in which the roots of the plants rest, a plate for preventing the displacement of the plants from the blocks in their vertical movement and permitting the displacement of the plants at the end of the vertical movement, the forward ends of the plants being released first whereby the forward movement of the planter will cause the plants to assume a vertical position and means for closing the furrow and packing the earth about the roots of the plants.

4. In a celery planter, the combination with a vertically movable endless belt having a plurality of blocks extending transversely thereof and arranged to support the stalks of the plants, which blocks are provided with beveled portions for receiving the roots of the plants, of means for actuating the belt.

5. In a celery planter, the combination with an endless vertically arranged belt, of blocks extending transversely thereof and arranged to support the stalks of the plants, the said blocks having cut-out portions arranged to support the roots of the plants in downwardly extending positions.

In testimony whereof, I affix my signature, in the presence of two witnesses.

HENRY A. BLEY.

Witnesses:
GORDON S. MOHR,
A. J. STRAUB.

Copies of this patent may be obtained for five cents each, by addressing the "Commissioner of Patents, Washington, D. C."